Oct. 2, 1945.  V. V. MASON  2,385,927
NUT OR THE LIKE AND BLANK THEREFOR
Filed March 23, 1943
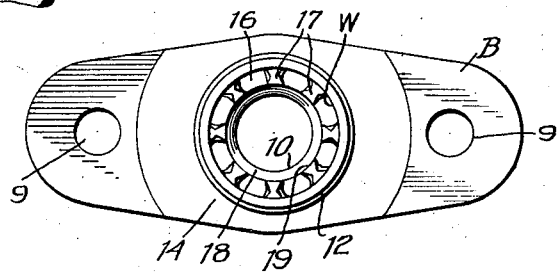
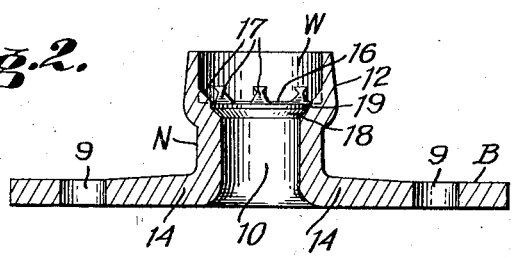
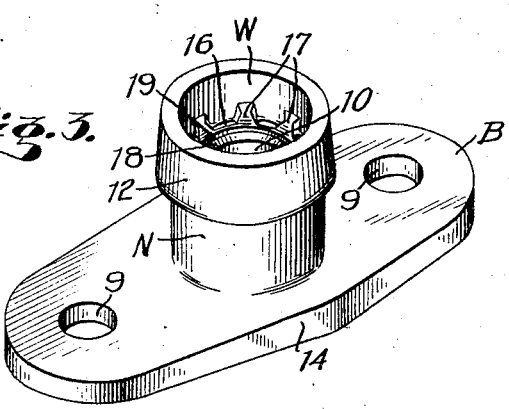
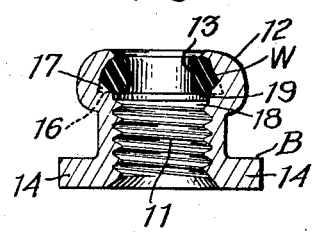
INVENTOR
*Veyne V. Mason*
BY
*Horace B. Van Valkenburgh*
ATTORNEY Patented Oct. 2, 1945

2,385,927

UNITED STATES PATENT OFFICE 2,385,927

NUT OR THE LIKE AND BLANK THEREFOR

Veyne V. Mason, Scotch Plains, N. J., assignor to Elastic Stop Nut Corporation of America, a corporation of New Jersey Application March 23, 1943, Serial No. 480,140

3 Claims. (Cl. 151—7)

This invention relates to nuts or the like, and particularly to anchor nuts of a type used extensively in aircraft and the like, wherein high strength and light weight are factors of great importance. Also, this invention relates to self-locking nuts and fastenings, an example of which is a self-locking nut provided with a locking insert or washer in accordance with U. S. Patent 1,550,282. The insert or washer, preferably formed of fiber or the like, locks the nut and bolt or screw securely against loosening through vibration.

Anchor nuts are particularly useful in "blind" mountings, i. e. where the nut is inaccessible during assembly, and must be attached to one of the parts to be held together prior to assembly. For this purpose, anchor nuts are provided with a base having one or more laterally extending lugs, which lugs may be provided with rivet holes for attachment of the anchor nut.

Specifications for anchor nuts utilized in aircraft call for a tensile strength, determined by pull test, above a specified minimum. The weight, of course, should be as low as possible, since a nut or fastening having a weight much less than other nuts for the same purpose—and which still meets the strength requirements—has a tremendously increased value, since saving in weight is translated directly into load carrying capacity of the plane.

Among the objects of this invention are to provide an improved nut or fastening, and blank therefor, of the character described; to provide such a nut or fastening which is sufficiently strong to meet or more than meet tensile strength requirements, yet is lighter in weight than nuts previously used; to provide such a nut or fastening which may be formed of sheet metal or the like; to provide such a nut or fastening having a locking insert or washer, which may be formed of fiber or the like; to provide an improved anchor nut, which can meet tensile strength specifications, yet is considerably lighter in weight than nuts previously used; to provide an anchor nut which may be formed of sheet metal or the like by a series of stamping operations; and to provide an improved blank particularly useful in making a nut of the above character.

Other objects and novel features of this invention will become apparent from the following description and accompanying drawing, in which:

Fig. 1 is a top view of an anchor nut blank constructed in accordance with this invention, prior to tapping and placement of a locking washer in a well adapted to receive the same;

Fig. 2 is a longitudinal section of the nut blank of Fig. 1;

Fig. 3 is a perspective view of the nut blank of Fig. 1; and

Fig. 4 is a cross-section of a nut constructed in accordance with this invention, after the blank of Figs. 1 to 3 has been tapped and the locking washer assembled therein.

As in Figs. 1 to 3, the nut blank comprises a base B provided with rivet holes 9; a cylindrical neck N extending laterally from the base B and having a bore 10 adapted to be tapped to form threads 11 of Fig. 4; and a locking insert or washer receiving well W, having sides 12 adapted to be closed over onto a washer 13, as in Fig. 4. The nut blank is preferably made of sheet metal or the like, by a series of stamping operations. In one series of operations, a circular blank is punched from sheet metal stock. The neck N and washer well W are formed by first producing a shallow bulge of relatively large diameter, then decreasing the diameter of the bulge and increasing its depth, in successive steps, until a relatively long cylindrical protuberance is produced. The end of the protuberance is then punched out, after which the sides are flared, in successive steps, to produce the washer well. The rivet holes are then pierced and the waste metal trimmed from the base. It will be understood, of course, that the blank and nuts of this invention may be made in other ways or by a different series of steps.

In accordance with this invention, the base B is substantially thicker adjacent neck N, as at section 14, than at points removed therefrom; also, section 14 of base B may be thicker than any other section of the nut. Section 14 preferably has a thickness sufficient to produce a tensile strength, on pull test, above a predetermined minimum, and the remainder of the nut is sufficiently thinner than section 14 to reduce the weight. Section 14 need be thickened only a relatively small amount to increase considerably the tensile strength of the nut, on pull test, as it has been discovered that thickening the base adjacent the neck increases the tensile strength of the nut, on pull test, to a degree far out of proportion to the amount of additional metal provided in the thickened portion. As is well known, practical utility requires that nuts be countersunk at the entrance end of the threaded bore to guide and facilitate entry into the nut of the threads of a cooperating screw or bolt, and such construction is followed in the present instance as is clearly evident from the drawing. Countersinking, however, removes metal from a critical place in the case of a thin walled structure, since in a tensile application the place of juncture between the neck and the base is subjected to concentrated shear stress. By the present construction, the thickened base at the place of juncture overcomes this deficiency.

The washer well W is provided with a seat 16 and a plurality of projections 17, which projections are adapted to bite or sink into the washer and prevent the same from turning and which may be formed during one of the flaring operations producing the washer well.

Advantageously, a bevel 18 tapering outwardly toward the washer well is provided between bore 10 of neck N and seat 16 of the washer well. The extent of bevel 18 need not be great, since a considerable portion thereof is cut away or forms part of the top thread. Bevel 18 has an important function, in that it has been discovered that the bevel substantially effectively prevents the washer from smashing down the top screw thread. It is desirable that the threads extend as close as possible to the washer well, to provide the greatest amount of thread strength, but when the threads extend relatively close to the seat, without the bevel, the top thread tends to be smashed down by the washer during the closing operation. A smashed thread will strip the plating from a bolt or screw, thus increasing the danger of corrosion. Obviously, screws and bolts utilized to hold essential parts of planes together cannot be stripped of protective plating with impunity.

Bevel 18 is particularly effective in conjunction with a cylindrical lip 19, disposed between bevel 18 and seat 16, which lip reduces the amount of metal to be displaced when the projections are formed, and also cooperates with bevel 18 in further assisting to prevent the washer from smashing down the top thread.

The features relating to the formation of the washer well and the distinctive features of projections bevel and lip above described form the claimed subject matter of U. S. Patents Nos. 2,378,609 and 2,378,610 granted June 19, 1945, on the applications of Leo J. Wesley.

The thickness of the wall of neck N need be only sufficiently great to provide for threads 11 and enough metal to withstand a longitudinal pull. It has been found that the wall of neck N, prior to threading, need be only substantially as thick as the sheet metal from which the nut is made, when the base is thickened at the place of juncture in accordance with the present invention, in order for the nut to meet the pull test requirements for tensile strength applications.

Although this invention has been explained in connection with an anchor nut adapted to be utilized in fastening parts of an airplane or the like together, it will be understood that the principles thereof are applicable to many types of nuts, fittings, and other fastening elements, and that the configuration of the nut may vary considerably. It will also be understood that other and various changes may be made without departing from the spirit and scope of this invention, as defined in the appended claims.

What is claimed is:

1. A light-weight nut of sheet metal or the like comprising a base portion and a threaded tubular neck portion extending laterally from said base portion, the metal of said base portion being thicker at the place of juncture than the metal of said neck portion and the section of the base portion tapering away from the place of juncture to a thinner section substantially the same as that of the neck portion.

2. A light-weight nut of sheet metal or the like comprising a base portion and a tubular neck portion providing a threaded bore extending laterally from said base portion, the end of said bore at the place of juncture between said neck portion and said base portion being countersunk to guide a bolt or screw into the bore and the metal of said base portion at the place of juncture being thickened to provide a minimum section of metal at the place of juncture heavier than the section of metal in the threaded bore part of said neck portion, the thickened section of metal at said base portion tapering away from the place of juncture to the place of minimum thickness of said base portion at a place spaced substantially away from said place of juncture.

3. A light-weight nut of sheet metal or the like comprising a base portion and a tubular neck portion providing a threaded bore extending laterally from said base portion, the end of said bore at the place of juncture between said portions being countersunk to guide a bolt or screw into the bore and the metal of said base portion at the place of juncture being thickened to provide a minimum section of metal at the place of juncture heavier than the section of metal in the threaded bore part of said neck portion, the thickened section of metal at said base portion tapering away from the place of juncture to a section substantially the same as that of said neck portion.

VEYNE V. MASON.